US012208309B2

(12) United States Patent
Lee (10) Patent No.: US 12,208,309 B2
(45) Date of Patent: Jan. 28, 2025

(54) METHOD AND DEVICE FOR RECOMMENDING GOLF-RELATED CONTENTS, AND NON-TRANSITORY COMPUTER-READABLE RECORDING MEDIUM

(71) Applicant: MOAIS, INC., Seoul (KR)

(72) Inventor: Yong Geun Lee, Seoul (KR)

(73) Assignee: MOAIS, INC., Seoul (KR)

( * ) Notice: Subject to any disclaimer, the term of this patent is extended or adjusted under 35 U.S.C. 154(b) by 355 days.

(21) Appl. No.: 17/745,080

(22) Filed: May 16, 2022

(65) Prior Publication Data

US 2022/0273984 A1 Sep. 1, 2022

Related U.S. Application Data

(63) Continuation of application No. PCT/KR2020/017312, filed on Nov. 30, 2020.

(30) Foreign Application Priority Data

Nov. 29, 2019 (KR) .......................... 10-2019-0157370

(51) Int. Cl.
*G06V 40/10* (2022.01)
*A63B 24/00* (2006.01)
(Continued)

(52) U.S. Cl.
CPC ............ *A63B 24/0006* (2013.01); *G06T 5/73* (2024.01); *G06T 7/20* (2013.01); *G06V 10/82* (2022.01); *G06V 40/10* (2022.01); *G06V 40/23* (2022.01); *A63B 2024/0012* (2013.01); *A63B 2208/02* (2013.01); *A63B 2220/05* (2013.01); *A63B 2220/10* (2013.01); *A63B 2220/807* (2013.01); *G06T 2207/20084* (2013.01); *G06T 2207/20201* (2013.01); *G06T 2207/30196* (2013.01); *G06T 2207/30221* (2013.01); *G06V 2201/10* (2022.01)

(58) Field of Classification Search
CPC ....... A63B 24/0006; G06T 7/20; G06V 40/23
See application file for complete search history.

(56) References Cited

U.S. PATENT DOCUMENTS

2017/0239521 A1* 8/2017 Packard ................. A63B 63/00
2019/0347826 A1* 11/2019 Zhang ...................... G06N 3/08
(Continued)

FOREIGN PATENT DOCUMENTS

JP 2017-023637 A 2/2017
KR 10-2004-0000853 A 1/2004
(Continued)

*Primary Examiner* — James S. McClellan
(74) *Attorney, Agent, or Firm* — Dinsmore & Shohl LLP; Yongsok Choi, Esq.

(57) ABSTRACT

A method for recommending golf-related contents is provided. The method includes detecting at least one body part of a user from a captured image by using an artificial neural network model, when the captured image related to the golf swing of the user is acquired; estimating at least one problem about the golf swing of the user by referring to the position of the detected at least one body part; and deriving, in reference to information related to the problem associated with the golf-related contents, at least one piece of candidate content associated with the at least one problem from among golf-related contents.

21 Claims, 5 Drawing Sheets

(51) Int. Cl.
    *G06T 5/73*     (2024.01)
    *G06T 7/20*     (2017.01)
    *G06V 10/82*     (2022.01)
    *G06V 40/20*     (2022.01)

(56) References Cited

U.S. PATENT DOCUMENTS

| | | | | |
|---|---|---|---|---|
| 2020/0155899 | A1* | 5/2020 | Hixenbaugh | A63B 69/3614 |
| 2020/0185006 | A1* | 6/2020 | Tene | G11B 27/102 |
| 2021/0158501 | A1* | 5/2021 | Bhat | A63B 24/0062 |

FOREIGN PATENT DOCUMENTS

| | | |
|---|---|---|
| KR | 10-0772497 81 | 11/2007 |
| KR | 10-1428922 B1 | 8/2014 |
| KR | 10-2019-0073302 A | 6/2019 |

\* cited by examiner

METHOD AND DEVICE FOR RECOMMENDING GOLF-RELATED CONTENTS, AND NON-TRANSITORY COMPUTER-READABLE RECORDING MEDIUM

CROSS-REFERENCE TO RELATED APPLICATIONS

This application is a continuation of International Application No. PCT/KR2020/017312 filed on Nov. 30, 2020, which claims priority to Korean Patent Application No. 10-2019-0157370 filed on Nov. 29, 2019, the entire contents of which are herein incorporated by reference.

FIELD OF THE INVENTION

The present invention relates to a method, device, and non-transitory computer-readable recording medium for recommending golf-related contents.

BACKGROUND

As golf has become popular recently, techniques for analyzing images of a golfer's swing and providing useful information to the golfer have been introduced.

As an example of related conventional techniques, Korean Laid-Open Patent Publication No. 2009-105031 discloses a golf clinic system employing image processing techniques and an operation method thereof, the system comprising: a plurality of markers attached to a body and a golf club of a golf practitioner; a plurality of cameras for collecting images of a swing motion of the golf practitioner; an image analyzer for reconstructing two-dimensional images collected from the plurality of cameras into three-dimensional images, extracting spatial coordinates of the markers according to movements, and analyzing angular values of parts of the body and data for each stage in real time to output a clinic result in a report format; and a database in which kinematic clinic information on the swing motion is matched with member information and stored as digital data.

However, according to the techniques introduced so far as well as the above-described conventional technique, it is necessary to separately use an expensive instrument for recognizing a golfer's posture and motion, or to attach separate sensors (or markers) to the golfer's body and golf club, in order to estimate a problem with the golfer's swing.

Further, the techniques introduced so far as well as the above-described conventional technique have failed to propose a technique for analyzing a golfer's swing to estimate a problem with the golfer's swing, and providing the golfer with a golf-related content associated with the problem, thereby assisting in remedying the problem with the golfer's swing.

SUMMARY OF THE INVENTION

One object of the present invention is to solve all the above-described problems in prior art.

Another object of the invention is to detect at least one body part of a user from a photographed image of the user's golf swing using an artificial neural network model, estimate at least one problem with the user's golf swing with reference to a position of the at least one detected body part, and derive, with reference to information on problems associated with golf-related contents, at least one candidate content associated with the at least one problem from among the golf-related contents.

Yet another object of the invention is to light-weight an artificial neural network model using depthwise convolution and pointwise convolution, and detect at least one body part of a user from a photographed image of the user's golf swing using the light-weighted artificial neural network model.

The representative configurations of the invention to achieve the above objects are described below.

According to one aspect of the invention, there is provided a method for recommending golf-related contents, the method comprising the steps of: when a photographed image of a user's golf swing is acquired, detecting at least one body part of the user from the photographed image using an artificial neural network model; estimating at least one problem with the user's golf swing with reference to a position of the at least one detected body part; and deriving, with reference to information on problems associated with golf-related contents, at least one candidate content associated with the at least one problem from among the golf-related contents.

According to another aspect of the invention, there is provided a system for recommending golf-related contents, the system comprising: a body part detection unit configured to, when a photographed image of a user's golf swing is acquired, detect at least one body part of the user from the photographed image using an artificial neural network model; a problem estimation unit configured to estimate at least one problem with the user's golf swing with reference to a position of the at least one detected body part; and a content management unit configured to derive, with reference to information on problems associated with golf-related contents, at least one candidate content associated with the at least one problem from among the golf-related contents.

In addition, there are further provided other methods and systems to implement the invention, as well as non-transitory computer-readable recording media having stored thereon computer programs for executing the methods.

According to the invention, it is possible to analyze a user's golf swing to derive a problem with the user's golf swing, and provide the user with a golf-related content associated with the problem, thereby assisting in remedying the problem with the user's golf swing.

According to the invention, it is possible to light-weight an artificial neural network model using depthwise convolution and pointwise convolution, and detect at least one body part of a user from a photographed image of the user's golf swing using the light-weighted artificial neural network model in a mobile device, thereby accurately and efficiently estimating a problem with the user's golf swing in the mobile device, without using any separate sensor or instrument.

DETAILED DESCRIPTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Although embodiments related to a golf swing are described herein focusing on a full swing, the golf swing according to the invention should be understood in the broadest sense as encompassing all motions for moving a golf club. For example, the golf swing according to one embodiment of the invention may include a full swing, a half swing, a chip shot, a lobe shot, and a putt.

Although the descriptions herein are focused on golf, it will be apparent to those skilled in the art that the present invention may be utilized even for estimating information on motions performed in sports other than golf. For example, the present invention may be utilized for estimating information on a baseball swing or information on a workout or yoga posture.

Although the descriptions herein are focused on detecting joints from a photographed image of a user's golf swing in order to facilitate understanding, it should be understood that the present invention is not limited to detecting the joints and may also be utilized for detecting body parts other than the joints.

Configuration of the Entire System

Figure 1:
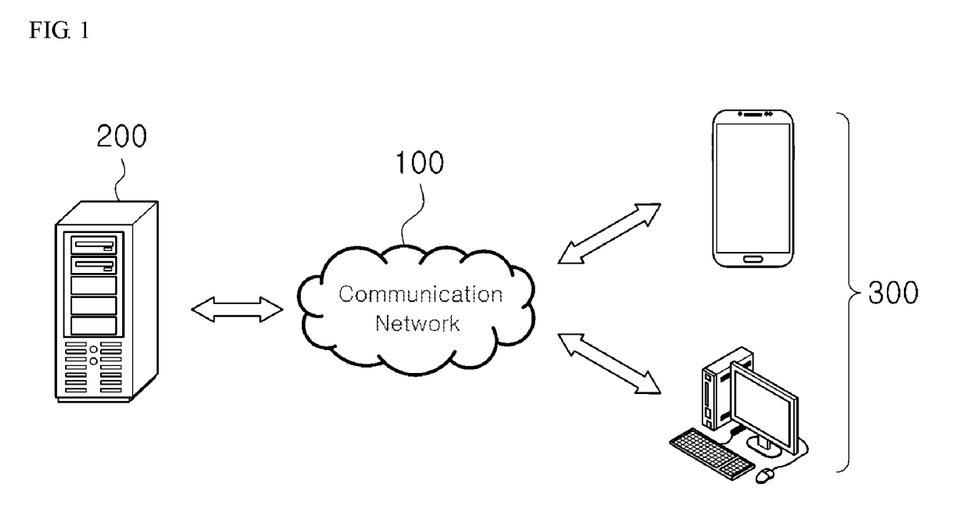
FIG. 1 schematically shows the configuration of an entire system for recommending golf-related contents according to one embodiment of the invention.

FIG. 1 schematically shows the configuration of the entire system for recommending golf-related contents according to one embodiment of the invention.

As shown in FIG. 1, the entire system according to one embodiment of the invention may comprise a communication network 100, a golf content recommendation system 200, and a device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the golf content recommendation system 200 according to one embodiment of the invention may function to: when a photographed image of a user's golf swing is acquired, detect at least one body part of the user from the photographed image using an artificial neural network model; estimate at least one problem with the user's golf swing with reference to a position of the at least one detected body part; and derive, with reference to information on problems associated with golf-related contents, at least one candidate content associated with the at least one problem from among the golf-related contents.

The configuration and functions of the golf content recommendation system 200 according to the invention will be discussed in more detail below.

Next, the device 300 according to one embodiment of the invention is digital equipment capable of connecting to and then communicating with the golf content recommendation system 200, and any type of digital equipment having a memory means and a microprocessor for computing capabilities may be adopted as the device 300 according to the invention.

In particular, the device 300 may include an application (not shown) for assisting a user to receive services such as recommendation of golf-related contents from the golf content recommendation system 200. The application may be downloaded from the golf content recommendation system 200 or a known web server (not shown).

Configuration of the Golf Content Recommendation System

Figure 2:
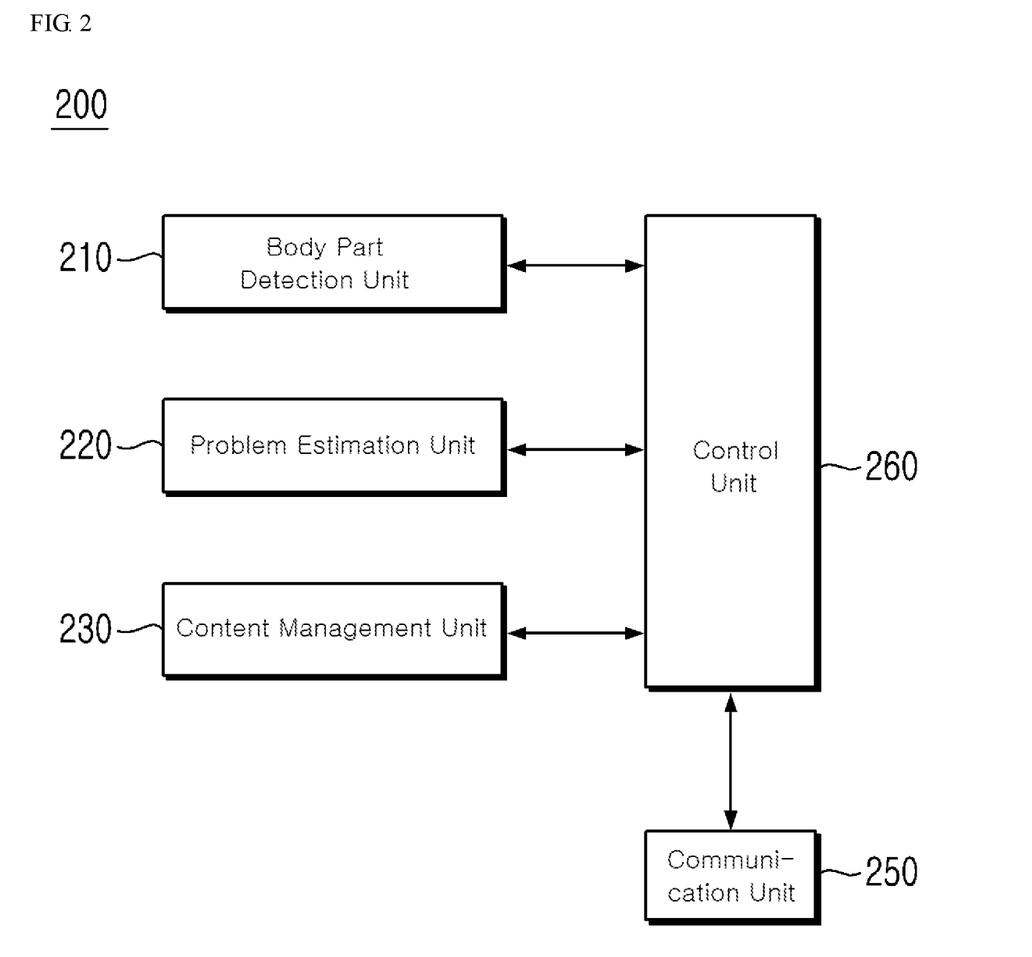
FIG. 2 specifically shows the internal configuration of a golf content recommendation system according to one embodiment of the invention.

Hereinafter, the internal configuration of the golf content recommendation system 200 crucial for implementing the invention and the functions of the respective components thereof will be discussed.

FIG. 2 specifically shows the internal configuration of the golf content recommendation system 200 according to one embodiment of the invention.

As shown in FIG. 2, the golf content recommendation system 200 according to one embodiment of the invention may comprise a body part detection unit 210, a problem estimation unit 220, a content management unit 230, a communication unit 250, and a control unit 260. According to one embodiment of the invention, at least some of the body part detection unit 210, the problem estimation unit 220, the content management unit 230, the communication unit 250, and the control unit 260 may be program modules to communicate with an external system. The program modules may be included in the golf content recommendation system 200 in the form of operating systems, application program modules, or other program modules, while they may be physically stored in a variety of commonly known storage devices. Further, the program modules may also be stored in a remote storage device that may communicate with the golf content recommendation system 200. Meanwhile, such program modules may include, but are not limited to, routines, subroutines, programs, objects, components, data structures, and the like for performing specific tasks or executing specific abstract data types as will be described below in accordance with the invention.

Meanwhile, the above description is illustrative although the golf content recommendation system 200 has been described as above, and it will be apparent to those skilled in the art that at least a part of the components or functions of the golf content recommendation system 200 may be implemented or included in an external system (not shown), as necessary.

First, the body part detection unit 210 according to one embodiment of the invention may function to, when a photographed image of a user's golf swing is acquired, detect at least one joint of the user from the photographed image using an artificial neural network model.

Specifically, the golf content recommendation system 200 according to one embodiment of the invention may acquire a photographed image of a user's golf swing, wherein the photographed image of the user's golf swing may be photographed by the device 300, or may be photographed by another device (not shown) and provided through the device 300. Further, the body part detection unit 210 according to one embodiment of the invention may function to detect at least one joint of the user from the acquired photographed image of the user's golf swing using an artificial neural network model.

Here, the photographed image of the user's golf swing according to one embodiment of the invention may be an RGB image. That is, the body part detection unit 210 according to one embodiment of the invention may detect at least one joint of the user using only an RGB image of the user's golf swing, without using depth information acquired from an instrument such as a depth camera or a depth sensor.

Further, the at least one detected joint of the user according to one embodiment of the invention may be detected by reconstructing the photographed image of the user's golf swing into a heat map image in the artificial neural network model. That is, at least one heat map image may be generated for each of at least one joint of the user, and the body part detection unit 210 according to one embodiment of the invention may detect each joint from the at least one generated heat map image. (For example, the position of the brightest point in each heat map image may be detected as the position of the corresponding joint.)

In addition, the at least one detected joint of the user according to one embodiment of the invention may be joints essentially required for estimating information on the user's golf swing. That is, when the information on the user's golf swing is estimated, the computational efficiency of the artificial neural network model may be improved by limiting the number of joints to be detected such that joints of relatively low importance are not detected.

Meanwhile, the artificial neural network model according to one embodiment of the invention may include, for example, a convolutional neural network (CNN) model, a recurrent neural network (RNN) model, a deep belief network (DBN) model, or an artificial neural network model in which the foregoing models are combined. However, the artificial neural network model according to one embodiment of the invention is not limited to those mentioned above, and may be diversely changed as long as the objects of the invention may be achieved.

Further, the artificial neural network model according to one embodiment of the invention may be a model that is light-weighted using depthwise convolution and pointwise convolution.

In addition, the artificial neural network model according to one embodiment of the invention may be a model that is light-weighted using a light-weighting algorithm such as pruning, weight quantization, and residual learning.

Specifically, since artificial neural network models commonly used in object recognition technology require a high level of computing resources to be consumed for a high level of recognition performance, it is often difficult to use such models in environments where only limited computing resources are provided (e.g., mobile devices). Therefore, according to one embodiment of the invention, an artificial neural network model may be light-weighted using depthwise convolution and pointwise convolution, and the light-weighted artificial neural network model may be used in a mobile device so that at least one joint of a user may be detected from a photographed image of the user's golf swing.

Here, the depthwise convolution according to one embodiment of the invention may refer to a convolution process in which a kernel is applied for each depth (i.e., each channel) of an input layer, in performing convolution in the artificial neural network model according to one embodiment of the invention. Meanwhile, since the method of operation using the applied kernel is the same as that of general convolution, a detailed description thereof will be omitted.

Further, the pointwise convolution according to one embodiment of the invention may refer to a convolution process in which a kernel of size $1 \times 1 \times M$ (i.e., a kernel of width 1, height 1, and depth M) is applied for each point of an input layer, in performing convolution in the artificial neural network model according to one embodiment of the invention.

Figure 3A:
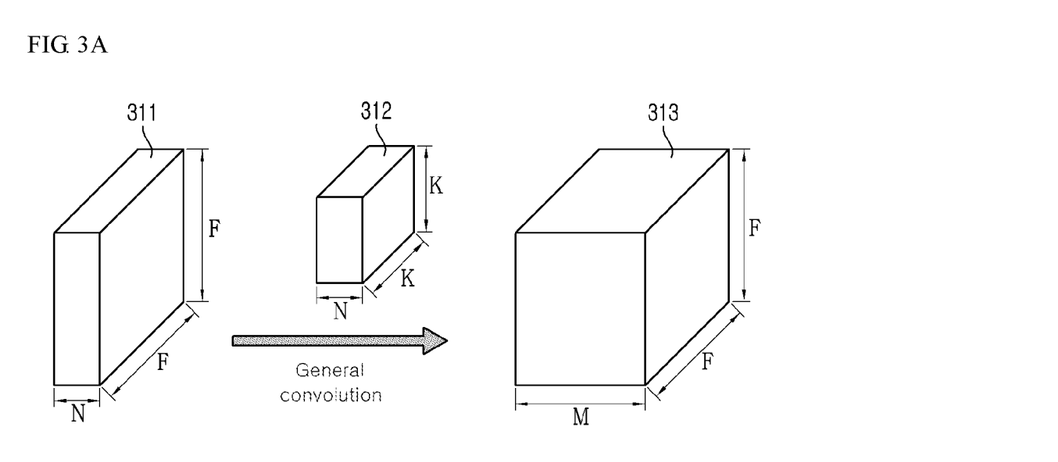
FIG. 3A illustratively shows how general convolution is performed according to one embodiment of the invention.

FIG. 3A illustratively shows how general convolution is performed according to one embodiment of the invention.

Figure 3B:
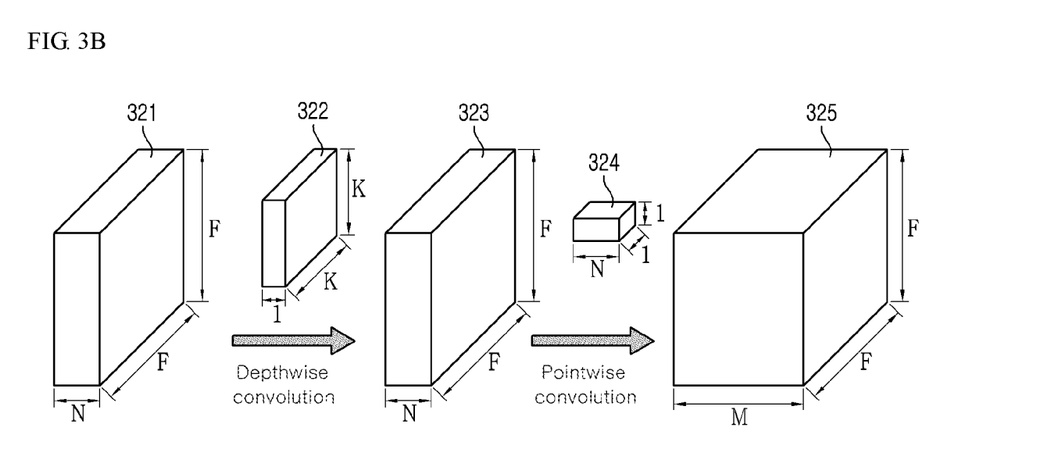
FIG. 3B illustratively shows how depthwise convolution and pointwise convolution are performed according to one embodiment of the invention.

FIG. 3B illustratively shows how depthwise convolution and pointwise convolution are performed according to one embodiment of the invention.

Referring to FIG. 3A, according to one embodiment of the invention, it may be assumed that the width, height, and depth of an input layer 311 are F, F, and N, respectively; the width, height, and depth of each kernel 312 are K, K, and N, respectively; and the width, height, and depth of an output layer 313 are F, F, and M, respectively. Here, it is assumed that padding and stride are appropriately sized such that there is no change in the width and height of the input layer 311 and the output layer 313. In this case, in the general convolution, the kernel 312 is applied to the input layer 311 to constitute one depth of the output layer 313 (through $F \times F \times K \times K \times N$ operations), and these operations are performed for M kernels 312 so that a total of $F \times F \times K \times K \times N \times M$ operations are performed.

Referring to FIG. 3B, according to one embodiment of the invention, it may be assumed that the width, height, and depth of an input layer 321 are F, F, and N, respectively; the width, height, and depth of each kernel 322 in the depthwise convolution are K, K, and 1, respectively; the width, height, and depth of each kernel 324 in the pointwise convolution are 1, 1, and N, respectively; and the width, height and depth of an output layer 325 are F, F, and M, respectively. In this case, the kernel 322 is applied for each depth of the input layer 321 to constitute each depth of an intermediate layer 323 (through F×F×K×K×1×N operations). Then, the kernel 324 is applied for each point of the intermediate layer 323 to constitute one depth of the output layer 325 (through F×F×1×1×N operations), and these operations are performed for M kernels 324 so that a total of F×F×1×1×N×M operations are performed in the pointwise convolution. Therefore, according to one embodiment of the invention, a total of (F×F×K×K×1×N)+(F×F×1×1×N×M) operations are performed in the depthwise convolution and the pointwise convolution, so that the amount of operations is reduced compared to the general convolution.

Meanwhile, the light-weighting algorithms according to one embodiment of the invention are not necessarily limited to the above algorithms (i.e., the depthwise convolution and the pointwise convolution), and the order or number of times of applying each of the above algorithms may also be diversely changed.

Meanwhile, the photographed image of the user's golf swing according to one embodiment of the invention may be photographed after parameters of a photographing module (not shown) are established such that motion blur is reduced.

Specifically, when the body part detection unit 210 according to one embodiment of the invention detects at least one joint of the user from the photographed image of the user's golf swing using the artificial neural network model, the accuracy of the position of the detected joint may be reduced if there is a lot of motion blur in the photographed image. Therefore, according to one embodiment of the invention, the photographed image of the user's golf swing may be photographed after the parameters of the photographing module (not shown) are established such that motion blur is reduced, thereby minimizing the motion blur and increasing the accuracy of the position of the detected joint.

For example, according to one embodiment of the invention, it may be assumed that in order for the photographing module to photograph an image of the user's golf swing, the brightness of the image to be photographed is automatically established in consideration of photographing environment (hereinafter, "default brightness"). In this case, a parameter establishment unit (not shown) according to one embodiment of the invention may minimize motion blur by lowering an exposure value of the photographing module. Further, in order to prevent the brightness of the image to be photographed from being reduced as the exposure value is lowered, a gain value may be increased such that the brightness of the image to be photographed is similar to the default brightness, thereby maintaining the brightness of the image to be photographed at a level similar to the default brightness while minimizing the motion blur. Meanwhile, the photographing module may be included in the device 300 according to one embodiment of the invention.

Next, the problem estimation unit 220 according to one embodiment of the invention may function to estimate at least one problem with the user's golf swing with reference to a position of the at least one joint of the user detected by the body part detection unit 210 according to one embodiment of the invention.

Specifically, the problem estimation unit 220 according to one embodiment of the invention may function to estimate a posture of the user with reference to at least one of a type of the at least one joint of the user detected by the body part detection unit 210 according to one embodiment of the invention, a position of the at least one joint of the user, a distance between the at least one joint of the user and at least one other joint of the user, and an angle formed between the at least one joint of the user and at least one other joint of the user, and estimate at least one problem with the user's golf swing with reference to the estimated posture.

Here, the problem with the golf swing according to one embodiment of the invention may include head-up, early extension, sway, and the like. However, the problem with the golf swing according to one embodiment of the invention is not limited to those mentioned above, and may be diversely changed as long as the objects of the invention may be achieved.

Further, the problem estimation unit 220 according to one embodiment of the invention may estimate at least one problem with the user's golf swing using rule-based learning. According to one embodiment of the invention, the rule-based learning may include, but is not limited to, decision tree learning. The decision tree learning refers to learning that is performed using a decision tree formed by schematizing rules and results into a tree structure.

Meanwhile, the at least one problem with the user's golf swing according to one embodiment of the invention may be estimated separately for each partial motion constituting the golf swing.

Specifically, the golf swing according to one embodiment of the invention may be composed of eight stages of partial motions such as an address, a takeaway, a back swing, a top-of-swing, a down swing, an impact, a follow-through, and a finish. Further, the at least one problem with the user's golf swing according to one embodiment of the invention may be estimated separately for each of the partial motions constituting the golf swing.

Further, with reference to at least one of a type of the at least one joint of the user detected by the body part detection unit 210 according to one embodiment of the invention, a position of the at least one joint of the user, a distance between the at least one joint of the user and at least one other joint of the user, and an angle formed between the at least one joint of the user and at least one other joint of the user, the problem estimation unit 220 according to one embodiment of the invention may derive to which of the above eight stages the photographed image of the user's golf swing corresponds, or extract at least one frame corresponding to a specific stage of the above eight stages from the photographed image of the user's golf swing. Accordingly, the problem estimation unit 220 according to one embodiment of the invention may function to estimate the at least one problem with the user's golf swing separately for each partial motion constituting the golf swing.

Meanwhile, the golf swing according to one embodiment of the invention is not necessarily separated into the eight stages as described above. That is, it may be separated to further include detailed stages constituting each of the eight stages, or such that at least some of the eight stages constitute one stage.

Further, the problem estimation unit 220 according to one embodiment of the invention may function to estimate information on a golf club with reference to the position of the at least one joint of the user detected by the body part detection unit 210 according to one embodiment of the invention, and estimate the at least one problem with the user's golf swing with further reference to the estimated information on the golf club.

Specifically, the problem estimation unit 220 according to one embodiment of the invention may estimate the information on the golf club with reference to at least one of a type of the at least one joint of the user detected by the body part detection unit 210 according to one embodiment of the invention, a position of the at least one joint of the user, a distance between the at least one joint of the user and at least one other joint of the user, and an angle formed between the at least one joint of the user and at least one other joint of the user.

Further, the information on the golf club according to one embodiment of the invention may include, but is not limited to, a position of the golf club, an angle between a body part of the user and the golf club, and the like.

Figures 4A, 4B:
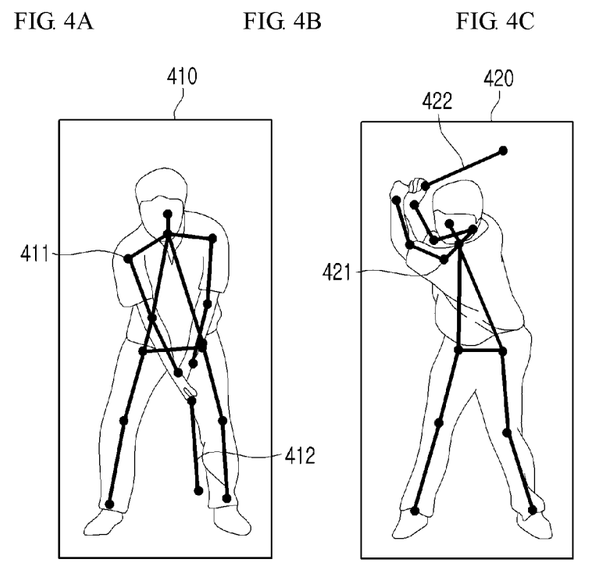
FIGS. 4A, 4B, and 4C illustratively show a visual representation of at least one joint of a user detected according to one embodiment of the invention and information on a golf club estimated according to one embodiment of the invention.
Figure 4C:
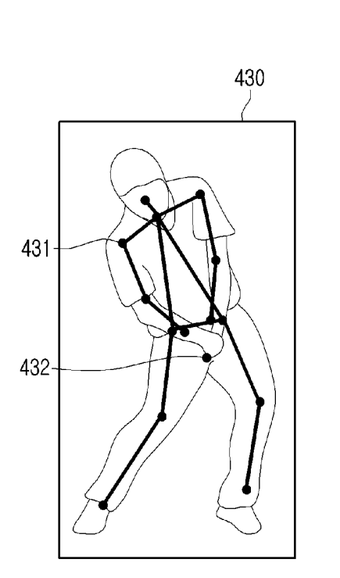
Figure 5:
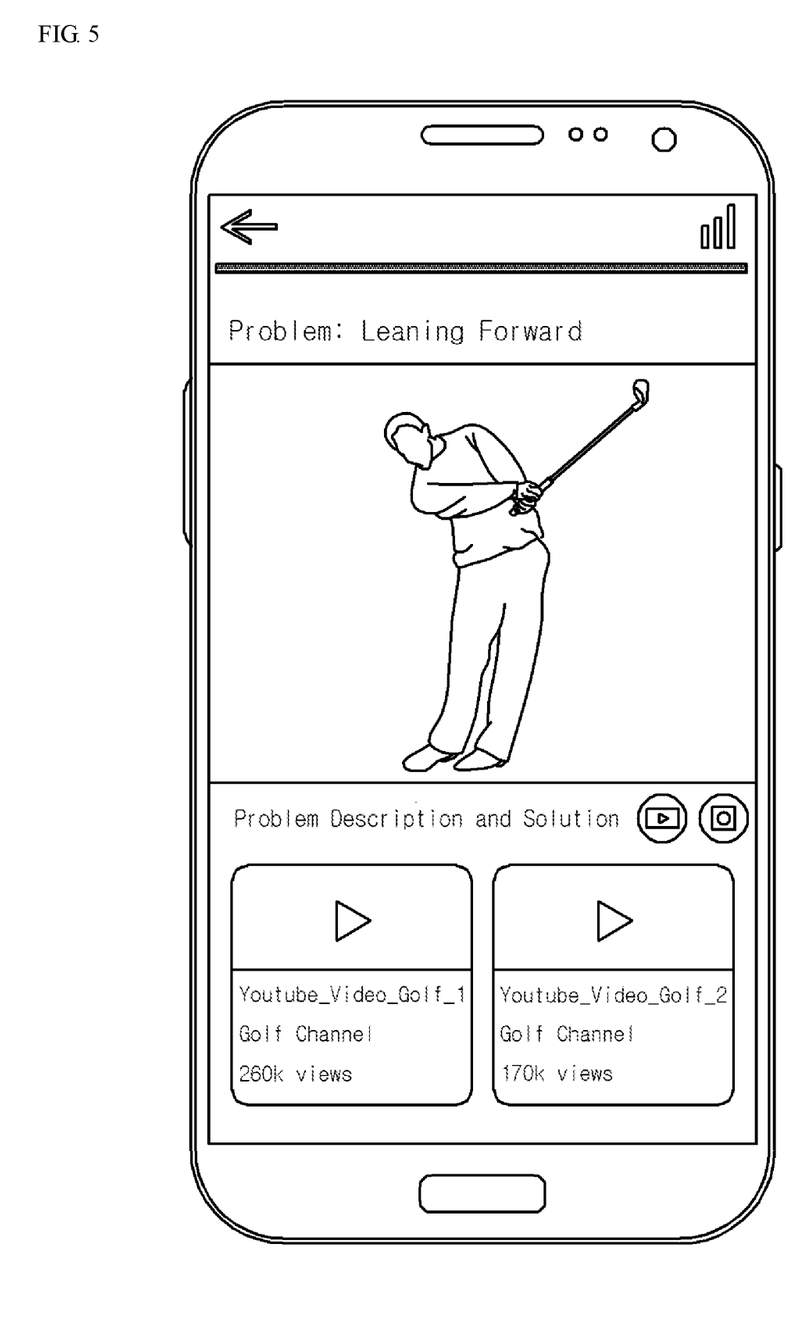
FIG. 5 illustratively shows how a problem with a user's golf swing estimated according to one embodiment of the invention and a matching content determined according to one embodiment of the invention are provided to the user.

FIGS. 4A to 4C illustratively show a visual representation of at least one joint of a user detected according to one embodiment of the invention and information on a golf club estimated according to one embodiment of the invention.

Referring to FIGS. 4A to 4C, according to one embodiment of the invention, photographed images 410, 420, and 430 of the user's golf swing may be acquired, and the photographed images may be RGB images photographed through the user's mobile device.

Referring further to FIGS. 4A to 4C, the body part detection unit 210 according to one embodiment of the invention may detect at least one joint 411, 421, and 431 of the user from the photographed images using an artificial neural network model that is light-weighted to be implemented in the mobile device. Further, the problem estimation unit 220 according to one embodiment of the invention may estimate a position and an angle 412, 422, and 432 of the golf club with reference to a position of the at least one detected joint.

Referring further to FIGS. 4A to 4C, the problem estimation unit 220 according to one embodiment of the invention may function to estimate a posture of the user with reference to the position of the at least one joint 411, 421, and 431 of the user detected by the body part detection unit 210 according to one embodiment of the invention, and estimate at least one problem with the user's golf swing with reference to the estimated posture.

Further, the at least one problem with the user's golf swing may be estimated separately for each partial motion constituting the golf swing. For example, a problem in an address stage may be estimated in FIG. 4A, a problem in a top-of-swing stage may be estimated in FIG. 4B, and a problem an impact stage may be estimated in FIG. 4C, respectively.

Next, the content management unit 230 according to one embodiment of the invention may function to derive, with reference to information on problems associated with golf-related contents, at least one candidate content associated with the at least one problem with the user's golf swing from among the golf-related contents.

Here, according to one embodiment of the invention, the golf-related contents may refer to contents related to golf that may be collected from known websites such as YouTube, Instagram, and blogs. The golf-related contents may include, but are not limited to, golf lesson videos that assist in remedying golf swing problems.

Further, according to one embodiment of the invention, the problems associated with the golf-related contents may refer to golf swing problems that are covered in the golf-related contents. For example, when a content contains a lesson on how to solve a head-up problem, the problem associated with the content may be head-up. In addition, according to one embodiment of the invention, a golf-related content may cover one or more problems associated with the content.

Meanwhile, the content management unit 230 according to one embodiment of the invention may estimate the information on the problems associated with the golf-related contents with reference to at least one of metadata, video data, and audio data of the golf-related contents.

Specifically, the content management unit 230 according to one embodiment of the invention may estimate information on a problem associated with a golf-related content by detecting at least one joint of a person from an image (or video data) included in the golf-related content. Meanwhile, the estimation may be performed in the same manner as described above in connection with estimating a problem with the user's golf swing, and thus a detailed description thereof will be omitted.

Further, the content management unit 230 according to one embodiment of the invention may estimate information on a problem associated with a golf-related content with reference to metadata of the golf-related content. For example, the information on the problem associated with the golf-related content may be estimated with reference to a title, a hashtag, and the like of the content.

Furthermore, the content management unit 230 according to one embodiment of the invention may estimate information on a problem associated with a golf-related content with reference to audio data of the golf-related content. For example, the information on the problem associated with the golf-related content may be estimated by recognizing a word associated with a golf swing problem in the audio data using a recurrent neural network model such as long short-term memory (LSTM) or gated recurrent units (GRUs).

Meanwhile, the content management unit 230 according to one embodiment of the invention may function to estimate the information on the problems associated with the golf-related contents separately for each partial motion constituting the golf swing (e.g., each of the eight steps as described above). The estimation may be performed with reference to at least one of metadata, video data, and audio data of the golf-related contents.

For example, the content management unit 230 according to one embodiment of the invention may estimate information on a problem associated with a golf-related content separately for each partial motion constituting the golf swing, by recognizing that the golf-related content is associated with a specific partial motion with reference to metadata (e.g., a title, a hashtag, etc.) of the golf-related content.

As another example, the content management unit 230 according to one embodiment of the invention may estimate information on a problem associated with a golf-related content separately for each partial motion constituting the golf swing, by recognizing a word associated with a specific partial motion in audio data of the golf-related content using a recurrent neural network model such as long short-term memory (LSTM) or gated recurrent units (GRUs)

Meanwhile, the content management unit 230 according to one embodiment of the invention may estimate information on a problem associated with a golf-related content separately for each partial motion constituting the golf swing, with reference to a position or the like of at least one joint detected from video data of the golf-related content, in the same manner as described above in connection with estimating at least one problem with the user's golf swing separately for each partial motion constituting the golf swing, and thus a detailed description thereof will be omitted.

Meanwhile, the content management unit 230 according to one embodiment of the invention may function to estimate information on a problem associated with a golf-related content by specifying a problem area derived from the golf-related content and analyzing the specified problem area.

Here, the problem area according to one embodiment of the invention may refer to at least a section containing the information on the problem associated with the golf-related content, among the entire sections of the golf-related content. For example, the problem area may be a section covering a golf swing problem, among the entire sections of a golf lesson video. Further, the problem area may refer to an area within a specific video frame or image.

Further, the content management unit 230 according to one embodiment of the invention may derive the problem area with reference to at least one of video data and audio data of the golf-related content.

For example, the content management unit 230 according to one embodiment of the invention may specify at least a section containing the information on the problem associated with the golf-related content from among the entire sections of the golf-related content, with reference to at least one of a position of at least one joint detected from video data of the golf-related content, a distance between the at least one joint and at least one other joint, and an angle formed between the at least one joint and at least one other joint.

As another example, the content management unit 230 according to one embodiment of the invention may specify at least a section containing the information on the problem associated with the golf-related content from among the entire sections of the golf-related content, by recognizing a word associated with a golf swing problem in audio data of the golf-related content using a recurrent neural network model such as long short-term memory (LSTM) or gated recurrent units (GRUs).

Meanwhile, when the information on the problem associated with the golf-related content is estimated from the content, the content management unit 230 according to one embodiment of the invention may tag the information on the problem associated with the content to the content and stored it in a database (not shown).

Further, the content management unit 230 according to one embodiment of the invention may function to derive at least one candidate content associated with the at least one problem with the user's golf swing from among the golf-related contents.

Specifically, the content management unit 230 according to one embodiment of the invention may compare the information on the problems associated with the golf-related contents and the at least one problem with the user's golf swing, and derive a golf-related content as a candidate content if one or more problems associated with the golf-related content match with the at least one problem with the user's golf swing.

Next, a matching content determination unit (not shown) according to one embodiment of the invention may function to calculate a matching score for each of the at least one candidate content, and determine at least one matching content to be provided to the user on the basis of the calculated matching score.

Specifically, the matching content determination unit (not shown) according to one embodiment of the invention may calculate a matching score for each of the at least one candidate content, in consideration of at least one of the number of problems associated with the candidate content, the number of problems matching between the at least one problem with the user's golf swing and the problems associated with the candidate content, types of the matching problems, and determining factors including the number of views of the candidate content.

Here, the at least one problem with the user's golf swing may be given priority according to its type. For example, among the at least one problem with the user's golf swing, the highest priority may be given to head-up and the next highest priority may be given to sway.

Further, in order to calculate a matching score for each of the at least one candidate content, a predetermined weight or priority may be given to each of the determining factors. For example, the weight may be defined as a quantified numerical value (e.g., a numerical value between 0 and 1), and the priority may be defined as the order in which the determining factors are considered in calculating the matching score (e.g., only when the matching score of each candidate content calculated by a determining factor having the highest priority is the same, the matching score may be calculated in consideration of a determining factor having the next highest priority).

Next, the communication unit 250 according to one embodiment of the invention may function to enable data transmission/reception from/to the body part detection unit 210, the problem estimation unit 220, and the content management unit 230.

Lastly, the control unit 260 according to one embodiment of the invention may function to control data flow among the body part detection unit 210, the problem estimation unit 220, the content management unit 230, and the communication unit 250. That is, the control unit 260 according to the invention may control data flow into/out of the golf content recommendation system 200 or data flow among the respective components of the golf content recommendation system 200, such that the body part detection unit 210, the problem estimation unit 220, the content management unit 230, and the communication unit 250 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for recommending golf instructional videos, the method comprising the steps of:
   in response to acquiring a photographed image of a golf swing of a user, detecting at least one body part of the user from the photographed image using an artificial neural network model;
   estimating at least one problem of the golf swing of the user based on a position of the at least one detected body part;
   recognizing words in audio data associated with partial motions of golf swings in golf instructional videos by using a recurrent neural network model;
   estimating one or more problems associated with a golf swing in each of the golf instructional videos based on the recognized words;
   determining candidate golf instructional videos among the golf instructional videos by comparing the estimated at least one problem of the golf swing of the user and the estimated one or more problems associated with the golf swing in each of the golf instructional videos; and
   providing one or more of the candidate golf instructional videos to a device of the user.

2. The method of claim 1, wherein the artificial neural network model is light-weighted using depthwise convolution and pointwise convolution.

3. The method of claim 1, wherein in the estimating step, information on a golf club is estimated with reference to the position of the at least one detected body part, and the at least one problem is estimated with further reference to the estimated information on the golf club.

4. The method of claim 1, wherein at least one of the at least one problem and the one or more problems associated with a golf swing in each of the golf instructional videos is estimated separately for each partial motion constituting the golf swing.

5. The method of claim 1, further comprising the step of:
   before the photographed image is acquired, establishing parameters of a photographing module such that motion blur is reduced.

6. The method of claim 1, wherein the one or more problems associated with the golf swing in each of the golf instructional videos is estimated by analyzing problem areas derived from the golf instructional videos.

7. The method of claim 6, wherein the problem areas are derived with reference to at least one of video data and audio data of the golf instructional videos.

8. The method of claim 1, wherein the one or more problems associated with the golf swing in each of the golf instructional videos is further estimated with reference to at least one of metadata, video data, and audio data of the golf instructional videos.

9. A non-transitory computer-readable recording medium having stored thereon a computer program for executing the method of claim 1.

10. The method of claim 1, further comprising:
    calculating a matching score for each of the candidate golf instructional videos; and
    providing the one or more of the candidate golf instructional videos to the device of the user based on the calculated matching scores.

11. The method of claim 10,
    wherein the matching score for each of the candidate golf instructional video is calculated based on a number of problems matching between the at least one problem of the golf swing of the user and the one or more problems associated with a golf swing in each of the golf instructional videos.

12. The method of claim 1, wherein:
    the one or more problems associated with the golf swing in each of the golf instructional videos are estimated further based on metadata of the golf instructional videos.

13. The method of claim 1, wherein each of the partial motions is one of an address, a takeaway, a back swing, a top-of-swing, a down swing, an impact, a follow-through, and a finish.

14. A system for recommending golf instructional videos, the system comprising:
    a body part detection unit configured to, in response to acquiring a photographed image of a golf swing of a user, detect at least one body part of the user from the photographed image using an artificial neural network model;
    a problem estimation unit configured to estimate at least one problem of the golf swing of the user based on a position of the at least one detected body part;
    a content management unit configured to:
       recognize words in audio data associated with partial motions of golf swings in golf instructional videos by using a recurrent neural network model;
       estimate one or more problems associated with a golf swing in each of the golf instructional videos based on the recognized words; and
       determine candidate golf instructional videos among the golf instructional videos by comparing the estimated at least one problem of the golf swing of the user and the estimated one or more problems associated with the golf swing in each of the golf instructional videos; and
    a communication unit configured to transmit one or more of the candidate golf instructional videos to a device of the user.

15. The system of claim 14, wherein the artificial neural network model is light-weighted using depthwise convolution and pointwise convolution.

16. The system of claim 14, wherein the problem estimation unit is configured to estimate information on a golf club with reference to the position of the at least one detected body part, and estimate the at least one problem with further reference to the estimated information on the golf club.

17. The system of claim 14, wherein at least one of the at least one problem and the one or more problems associated with a golf swing in each of the golf instructional videos is estimated separately for each partial motion constituting the golf swing.

18. The system of claim 14, wherein the body part detection unit is configured to, before the photographed image is acquired, establish parameters of a photographing module such that motion blur is reduced.

19. The system of claim 14, wherein the one or more problems associated with the golf swing in each of the golf instructional videos is estimated by analyzing problem areas derived from the golf instructional videos.

20. The system of claim 14, wherein the one or more problems associated with the golf swing in each of the golf instructional videos is estimated with reference to at least one of metadata, video data, and audio data of the golf instructional videos.

21. The system of claim 19, wherein the problem areas are derived with reference to at least one of video data and audio data of the golf instructional videos.

\* \* \* \* \*